Oct. 12, 1954  E. M. GREER  2,691,350
HYDRAULIC EQUIPMENT
Filed Sept. 10, 1951
3 Sheets-Sheet 1
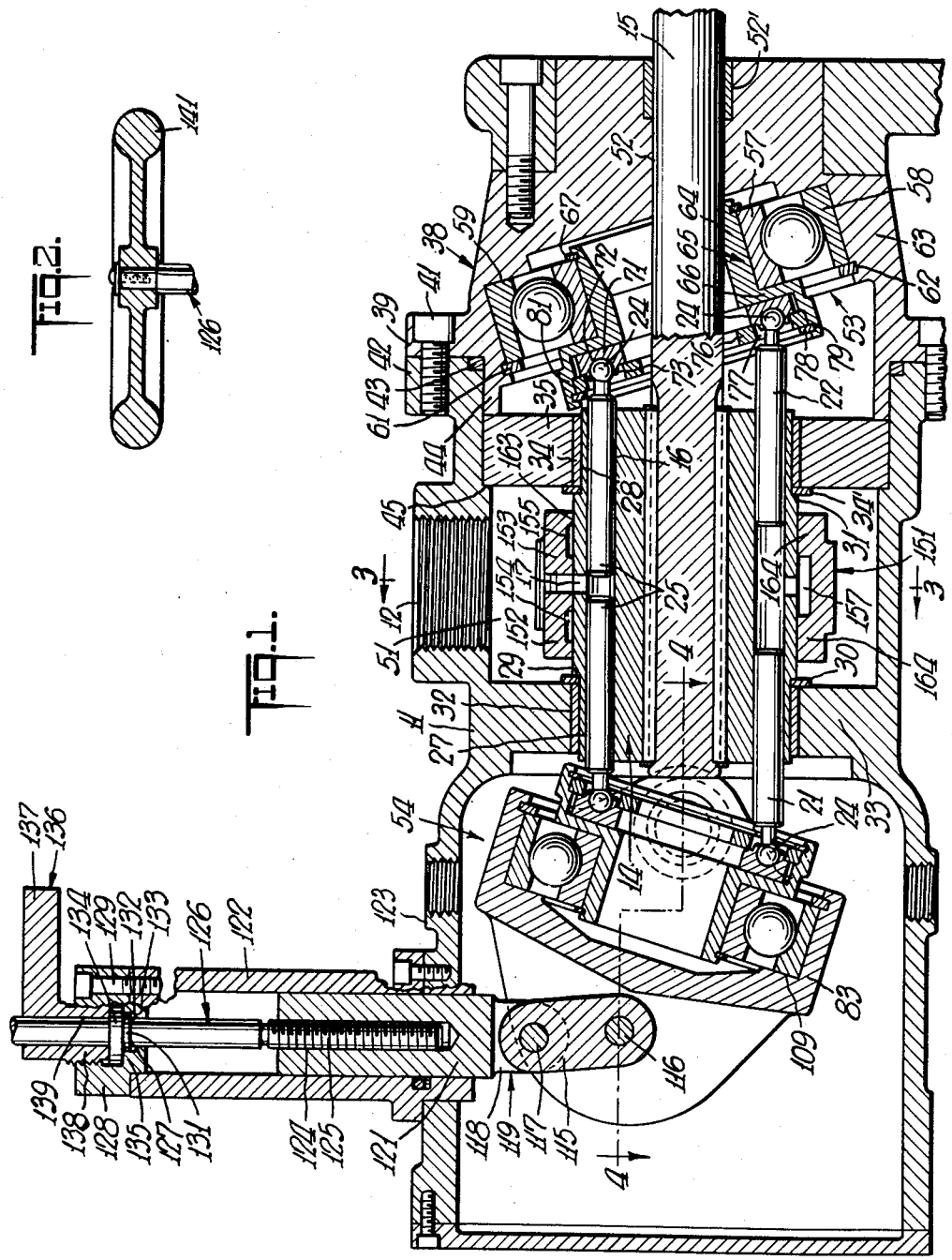
INVENTOR
Edward M. Greer
BY
Dean Fairbank & Hirsch
ATTORNEYS Oct. 12, 1954
E. M. GREER
2,691,350
HYDRAULIC EQUIPMENT
Filed Sept. 10, 1951
3 Sheets-Sheet 2
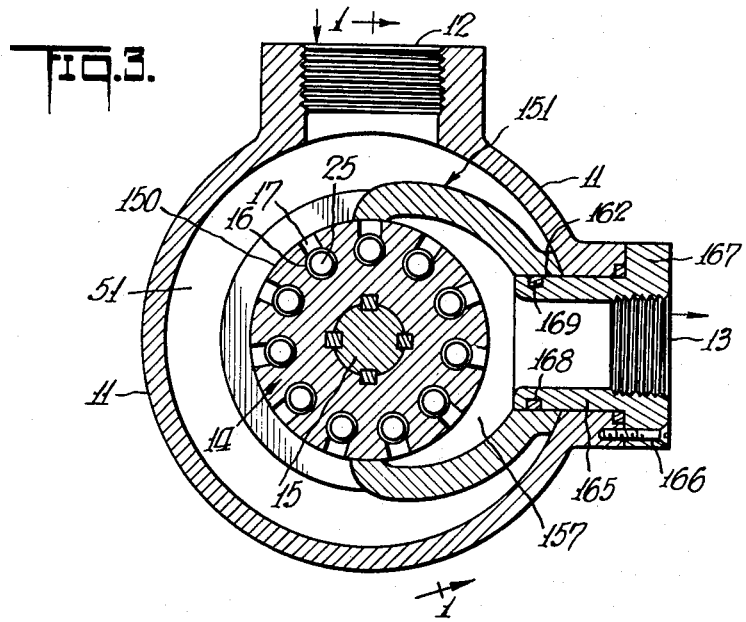
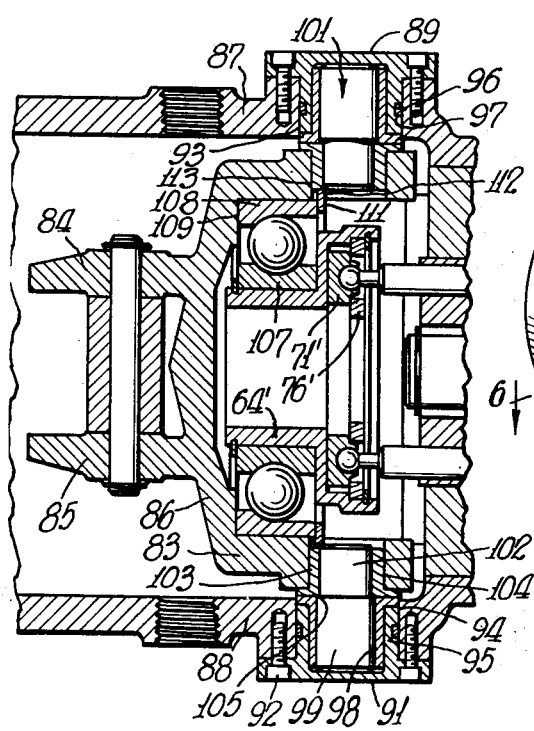
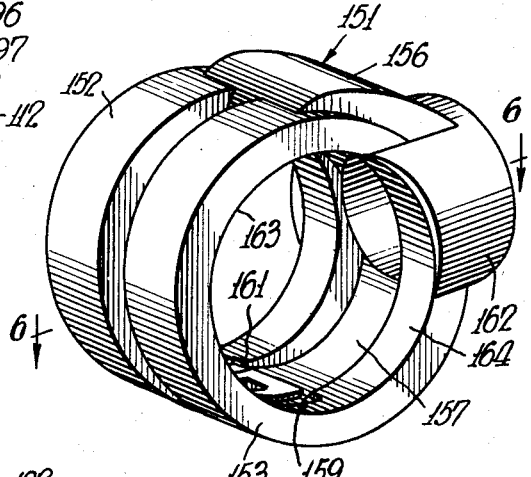
INVENTOR
*Edward M. Greer*
BY
*Dean Fairbank & Hirsch*
ATTORNEYS Oct. 12, 1954
E. M. GREER
2,691,350
HYDRAULIC EQUIPMENT
Filed Sept. 10, 1951
3 Sheets-Sheet 3
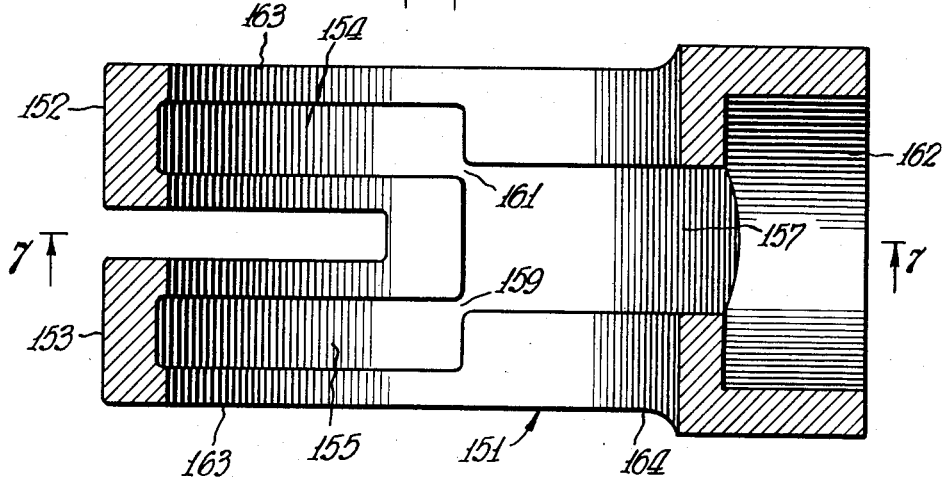
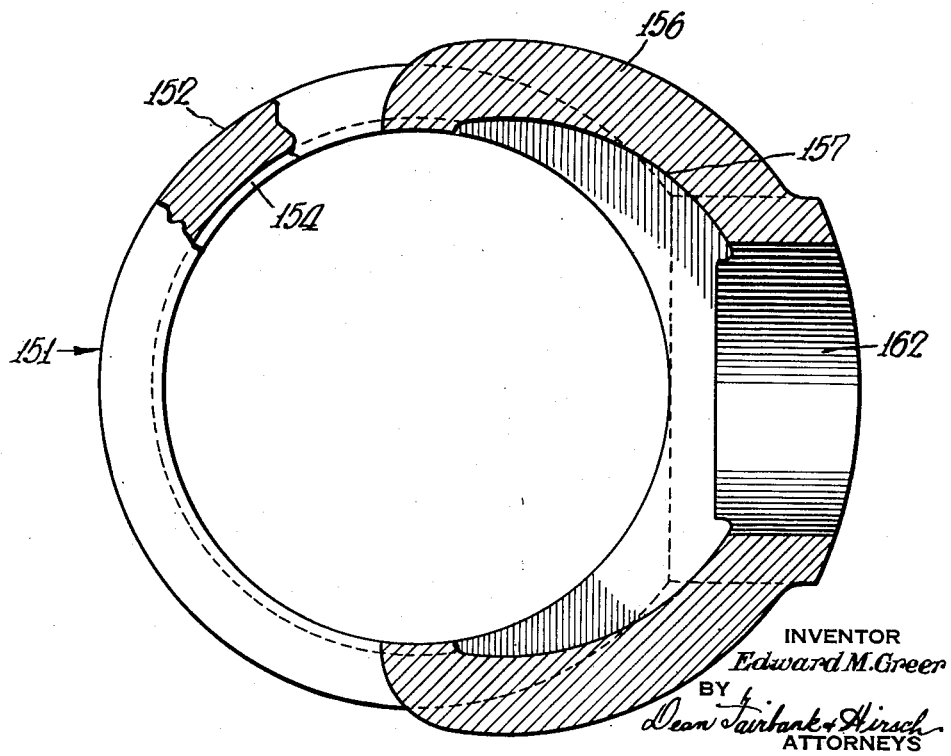
INVENTOR
*Edward M. Greer*
BY
*Dean Fairbank & Hirsch*
ATTORNEYS Patented Oct. 12, 1954

2,691,350

UNITED STATES PATENT OFFICE 2,691,350

HYDRAULIC EQUIPMENT

Edward M. Greer, West Hempstead, N. Y., assignor to Greer Hydraulics, Inc., a corporation of New York Application September 10, 1951, Serial No. 245,875

3 Claims. (Cl. 103—162)

This invention relates to hydraulic equipment and more particularly to a fluid pump of the axial piston type.

As conducive to an understanding of the invention, it is noted that where hydraulic pumps are capable of delivering fluid such as oil at high pressures in the order of 5,000 p. s. i. and greater, in order that the pump may withstand such pressures, the casings are generally of heavy material such as cast iron or forgings. As a result, the pumps are difficult to handle and such heavy weight is a decided limitation in the use of the pump, especially when it is required on aircraft where weight is an important factor.

Moreover, oil will inevitably be forced under such high pressure through the inherently porous structure of the usual cast iron casing, with the need for added power to compensate for the loss of oil pressure due to such leakage.

Where the pump utilizes a rotor which is subjected to a radial load on the discharge side only, heavy bearings and consequently a heavy casing will be required to mount the rotor, and such bearings, in addition to being expensive, are subject to wear, requiring frequent stoppages for repairs.

As the pumping action will raise the temperature of the oil, causing the latter to get extremely hot, unless such heat is dissipated, differential expansion may occur between the various parts of the pump with resultant likelihood of "freezing" of the rotor and inoperativeness thereof. Where an elaborate cooling system is provided, the weight of the pump is materially increased and in addition the pump will be extremely costly and where the pump is stopped for cooling, it will be inefficient in operation.

Where the chamber into which the oil is discharged is part of the casing of the pump, such chamber must be conformed so as to have an inner diameter substantially equal to the outer diameter of the rotor to provide the close tolerances that are required in order to have a substantially oil tight seal between the sides of the discharge chamber and the periphery of the rotor. Where the casing is of thick heavy stock, by reason of the pressures to be exerted thereagainst and the heavy bearings to be supported thereby, it will be extremely difficult if not impossible immovably to retain the casing in a jig for machining.

It is accordingly among the objects of the invention to provide a piston pump which is relatively simple in construction, having but few parts which may readily be assembled and not likely to become out of order even with long use, and that may readily be manufactured with extremely close tolerances so that it may function at high pressures without leakage and has substantially one hundred per cent of the radial load on the rotor eliminated, thereby dispensing with the need for heavy ball or roller bearings to carry the rotor, which pump may have a relatively thin walled casing of low cost material such as cast iron or aluminum which is not required to withstand high internal pressures and may be operated continuously for long periods of time at extremely high pressures without overheating and without likelihood of seepage through such walls, and is not likely to have its rotor "freeze" due to high temperatures and differential expansion of the component parts of the pump.

While the invention is not in all its aspects necessarily limited to an axial piston pump, it finds a most advantageous application in that field. An axial piston pump is defined as one in which a rotor, bearing in a casing having inlet and outlet ports, carries a plurality of plungers slidably mounted in corresponding longitudinal bores therein, which plungers are reciprocated in suitable manner, to suck in and discharge liquid through a plurality of circumferentially spaced radial passageways which connect the respective longitudinal bores with the inlet and outlet ports.

According to one important feature of the invention, a balancing ring, which has the major portion of its outer surface spaced from the inner wall of the pump casing, encompasses the rotor between the bearing ends thereof. The balancing ring has a discharge chamber therein affording direct communication from the various radial passageways at one side of the rotor to the outlet port of the pump. The tremendous lateral thrust that is exerted against the side of the rotor adjacent the discharge chamber due to the high pressure evolved therein during operation of the pump is balanced at the opposite side of the balancing ring by means of a balancing chamber in the remaining half of the ring which is in communication with said discharge chamber and with the surface of the rotor.

As the balancing ring is spaced from the wall of the casing, the liquid drawn therein from the inlet port by the suction action of the pump will cover substantially the entire surface of such ring to provide a cooling effect.

In the accompanying drawings in which is shown one of various possible embodiments of the several features of the invention, Fig. 1 is a fragmentary longitudinal sectional view of the pump, Fig. 2 is a sectional view of the operating handle for the pump control screw, Fig. 3 is a transverse sectional view taken along line 3—3 of Fig. 1, Fig. 4 is a longitudinal sectional view taken along line 4—4 of Fig. 1, Fig. 5 is a perspective view of the balancing ring, Fig. 6 is a sectional view on a larger scale taken along line 6—6 of Fig. 5, and Fig. 7 is a sectional view take along line 7—7 of Fig. 6.

Referring now to the drawings, the pump desirably comprises a substantially cylindrical casing 11 of any suitable material such as cast iron, aluminum or the like having an oil inlet port 12 and an oil outlet port 13.

Rotatably mounted in the bore of the casing is a substantially cylindrical elongated rotor 14 coaxial with and keyed on an axial drive shaft 15. The rotor 14 has a plurality of equidistant longitudinal bores 16 therethrough spaced from the drive shaft 15. Leading into each of said bores 16 respectively, from the periphery of the rotor 14 is a plurality of circumferentially spaced radial passageways 17 desirably midway between the ends of the rotor which, as the rotor is turned by the drive shaft, becomes successively aligned with the oil inlet and outlet ports 12 and 13.

Slidably positioned in each of the bores 16 is a pair of piston rods or plungers 21 and 22 which are of such length that with the outer ends 24 thereof, which are preferably conformed as balls, extending beyond the associated bore, the inner ends 25 thereof may be brought into juxtaposition near the corresponding radial passageway 17.

Although the rotor 14 may be rotatably mounted in the casing in any suitable manner, in the embodiment herein shown, the rotor is desirably of reduced diameter at each end as at 27 and 28 defining annular shoulders 29 and 31. The reduced end 27 of the rotor is journalled in a bushing 32 affixed in an annular internal flange 33 formed integral with the casing, the shoulder 29 of said rotor abutting against a bearing washer 30, thereby substantially preventing axial displacement to the left of said rotor. The reduced end 28 of the rotor is journalled in a bushing 34 affixed in the bore of an annular retaining member 35, the shoulder 31 of the rotor abutting against a bearing washer 34' substantially preventing axial displacent of the rotor to the right.

The retaining member 35 is desirably secured in fixed position in the casing by means of a substantially cup-shaped end head 38 which has an external flange 39 affixed by screws 41 to a corresponding external flange 42 formed integral with the casing 11. Desirably, a resilient sealing member 43 is interposed between the casing and the end head 38 to provide an oiltight seal therebetween.

As shown in Fig. 1, the cup-shaped head 38 has an inwardly extending cylindrical portion 44 adjacent flange 39 which is coaxial with the rotor and which may abut against the retaining member 35 to urge the latter against an internal annular shoulder 45 formed in the bore of the casing. Thus when the screws 41 are tightened, the retaining member 35 will be securely retained in position without likelihood of displacement.

With the construction thus far described, an oil chamber 51 is provided defined by the wall of the casing, the annular flange 33 and the retaining member 35, and said chamber 51 is in communication with the oil inlet port 12.

In order to reciprocate the plungers 21, 22, to effect the pumping action upon rotation of the shaft 15 which extends through an axial opening 52 in end head 38 and is journalled in a suitable bushing 52', a pair of inclined members 53 and 54 is associated respectively with the protruding ball ends 24 of each pair of plungers 21, 22.

As shown in Fig. 1, the inclined member 53 desirably comprises a ball bearing structure having an inner race 57 and an outer race 58. The outer race 58 is desirably seated against an inclined annular shoulder 59 formed in the end head 38 and is securely retained against said shoulder as by means of a snap ring 61 positioned in an annular groove 62 in the side wall 63 of end head 38. The inner race 57 of the ball bearing structure 56 encompasses the substantially cylindrical wall 64 of a cup-shaped retainer 65, which has an annular floor 66 extending laterally outward from said cylindrical wall 64. The retainer 65 desirably is secured in said inner race by means of a snap ring 67 encompassing the end portion of the cylindrical wall 64 extending beyond said inner race 57. The floor 66 serves as a track for a plurality of slide members 71, which are desirably discs, each having a socket 72 in the outer face thereof to receive the ball end 24 of a plunger 22, said sockets each having an outstanding rim 73 which is turned over the associated ball end 24 securly to retain the latter in the socket yet provide free movement therein.

The slide members 71 are retained on the floor 66 by means of a ring member 76 which has a plurality of openings 77 through which the respective ball ends 24 of the adjacent plunger extend, the maximum diameter of the turned over rims 73 being less than the diameter of such openings. The ring member 76 is desirably retained in position by a snap ring 78 positioned in an internal annular groove 79 in the side wall 81 of retainer 65, the thickness of said slide members being slightly less than the distance between the ring 76 and floor 66 to permit movement of such slide members.

As shown in Figs. 1 and 4, the inclined member 54 desirably comprises a substantially cup-shaped housing 83 having a pair of spaced parallel plates 84 and 85 desirably formed integral with and extending rearwardly of the back wall 86 thereof. The housing 83 is desirably pivotally mounted between the side walls 87 and 88 of the casing and to this end such side walls desirably have opposed closure plates 89 and 91 affixed by screws 92 over openings 93 and 94 in said side walls 87 and 88 respectively. Each of the closure plates desirably has a cylindrical sleeve 95 preferably formed integral therewith and extending into the associated opening, a seal ring 96 positioned in an annular groove 97 in said sleeve providing an oiltight seal. Each sleeve 95 desirably has a bushing 98 affixed therein and rotatably mounting one end 99 of a trunnion 101, the other end 102 of said trunnion being of reduced diameter and journalled in a suitable bushing 103 affixed in an opening 104 in the side wall of housing 83. Thus, as bushing 103 rests on shoulder 105 formed by the reduced end 102 of trunnion 101, the latter will be restrained from inward movement into the opening 104 in the housing 83.

Positioned in housing 83 is a ball bearing structure comprising an inner race 107 and an outer race 108, the latter being retained against an annular shoulder 109 in housing 83 by means of a snap ring 111 positioned in an annular groove 112 in the side wall 113 of said housing. As the remaining portions of said inclined member 54 are identical to those of inclined member 53, they will not be further described and will carry the same reference numerals primed as that of inclined member 53.

Means are desirably provided to pivot the inclined member 54 on its trunnions 101 to vary the output of the pump. To this end, a link 115 is pivoted at one end on a pin 116 extending through parallel plates 84 and 85. The other end of the link 115 is pivotally mounted by means of a pin 117 between the legs 118 of a yoke 119 formed integral with and at the lower end of a plunger 121. The plunger 121 is slidably mounted in a sleeve 122 rising vertically above top wall 123 of the casing. The plunger 121 has an axial bore 124 therethrough in which is threaded the lower end 125 of an adjustment screw 126, the upper end of which extends through a bore 127 in a retaining block 128 affixed to the upper end of sleeve 122 by screws 129.

As shown in Fig. 1, the screw 126 has a collar 131 affixed thereto, the undersurface of which rests on a resilient seal ring 132 to retain the latter on an internal annular shoulder 133 in bore 127 to form an oiltight seal. A second collar 134 is affixed to adjustment screw 126 immediately above collar 131 and said collar 134 is seated on an annular shoulder 135 in said bore 127. A locking member 136 which desirably comprises a knob 137 having an axially threaded stem 138 with an axial bore 139 through which the adjusting screw extends, is screwed into the internally threaded bore 127 rigidly to clamp the collar 134 against annular shoulder 135 to retain adjustment screw 126 in fixed position. Desirably the outer end of the adjustment screw has a handwheel 141 affixed thereto to permit ready rotation of screw 126.

Where it is desired to vary the output of the pump, it is a relatively simple matter to loosen locking member 136 and rotate adjustment screw 126 by means of handwheel 141. If the handwheel is turned in a direction so that the plunger 121 will ride downwardly in the sleeve 122, the inclined member 54 through link 115 will be pivoted in a counterclockwise direction about its trunnions 101. If the inclined member 54 is moved so that it is parallel to the inclined member 53, the space between the inner ends 25 of the plungers will remain constant while they are being reciprocated, and hence no pumping action will be effected. Thus, the amount of pumping depends upon the relative inclination of the inclined members and the amount of oil pumped varies from zero when such inclined members are parallel to an amount greater than zero when they are at an angle with respect to each other.

According to the principal feature of the invention, means are provided hydraulically to balance the rotor 14 so that no radial thrust will be exerted thereagainst which would require heavy bearings to prevent malfunctioning of the machine, and such means are designed to restrict the pressure created by the pumping action to a limited area, so that such pumping action will exert no pressure against the wall of the oil chamber, i. e., the casing of the pump. In addition, such means are designed to permit circulation of oil in the chamber 51, thereby to prevent overheating of the pump so that it may be used continuously without stoppage for cooling.

To this end, a balancing ring 151 is positioned in the oil chamber 51 and encompasses the rotor 14 in line with the circumferentially spaced radial passageways 17 therein. The bore 150 of balancing ring 151 through which rotor 14 extends, is of diameter substantially the same as that of said rotor so that the latter will fit therein with close tolerance. The thickness of the balancing ring 151 is substantially less than the distance from the rotor 14 to the wall of the casing, and the width of the balancing ring, as shown in Fig. 1 is considerably less than the distance between bushings 32 and 34 so that the capacity of the oil chamber will be relatively large and substantially the entire outer surface of the balancing ring may be covered by a relatively thick layer of oil.

As shown in Figs. 1 and 5, the balancing ring 151 along substantially one-half of its circumference desirably is formed with two arcuate, spaced parallel members 152 and 153 positioned on each side respectively of the line of radial passageways 17, the space between said members 152 and 153 being slightly greater than the diameter of each of said radial passageways 17. Members 152 and 153 have arcuate grooves 154 and 155 respectively, in the undersurface thereof defining balancing chambers, the function of which will be hereinafter described. Substantially the other half of the circumference of the balancing ring desirably has a substantially arcuate projection 156 which is of diameter greater than that of arcuate members 152 and 153. The projection 156 has an annular groove 157 in the undersurface thereof defining a discharge chamber which lies over the line of radial passageways 17 and which, through passageways 159 and 161 communicates with annular grooves 154 and 155. Desirably the chamber 157 has a relatively large port 162 through which oil may be expelled. The area of the rotor exposed in arcuate groove 157 is substantially equal to the combined areas of the rotor exposed in arcuate grooves 154 and 155 to provide for hydraulic balancing of the rotor in the manner hereinafter to be described.

As shown in Fig. 1, when the rotor 14 is positioned in the bore 150 of balancing ring 151, the lateral edges 163 of arcuate grooves 154 and 155 as well as the lateral edges 164 of the arcuate groove 157 will be in extremely close proximity to the periphery of the rotor 14 so that substantially an oiltight seal will be effected therebetween.

To prevent rotation of the balancing ring 151, a sleeve 165 which extends into the oil port 162 of the balancing ring 151 is affixed to the casing by means of screws 166 which extend through lateral flange 167 of said sleeve 165. Desirably the inner end of the sleeve 165 in said oil port 162 has an external annular groove 168 in which is positioned a resilient seal ring 169, desirably an "O" ring, to afford an oiltight seal.

*Operation*

As the rotor 14 is turned by means of a motor (not shown) connected to shaft 15, the movement of the ball ends 24 of the plungers 21, 22 on the inclined members 53, 54 will cause the plungers to reciprocate in the associated bores 16 to effect a sucking action during substantially one-half of the cycle of rotation of the rotor and a discharge action during substantially the other half of the cycle.

Inasmuch as the path of movement of the ball ends 24 of the plungers is substantially oval, by reason of the inclination of the floor 66 and as the cup-shaped retainer 65 is circular, if the slide members 71 should be tightly clamped in place, snapping or breaking of the ball ends 24 might occur.

This difficulty is avoided by the construction herein in which the thickness of the slide members 71 is slightly less than the distance between the ring 76 and the floor 66, and the turned over rim 73 of the slide members has a maximum diameter slightly less than the diameter of the openings 77 in the ring. Thus, sufficient play of the slide member is afforded to prevent snapping of ball ends 24.

During the sucking action of the plungers 21, 22 as they are moved outward in their associated longitudinal bores 16, which will occur when they are adjacent the annular grooves 154, 155, oil will be drawn through oil inlet port 12 which is connected to a suitable oil reservoir (not shown) into oil chamber 51 and from such chamber 51 through the space between arcuate members 152 and 153 into radial passageways 17 and the associated bores 16. After the rotor has turned substantially 180 degrees, for example, so that the plungers are moved inwardly by reason of the coaction of the ball ends 24 thereof against the inclined floors 66 of the inclined members 53, 54, which will occur when they are adjacent the annular groove 157 which defines the discharge chamber, the oil previously sucked into the radial passageways 17 and associated bores 16, will be expelled therefrom into such discharge chamber and thence will be forced out through sleeve 165 which is connected to the equipment to be operated.

As the combined areas of the rotor exposed in balancing chambers 154 and 155 is substantially equal to that of the rotor exposed in discharge chamber 157, the radial load exerted against the rotor by the high pressure on the oil created in the discharge chamber 157 is opposed by the radial load on the rotor created by the pressure on the oil in the balancing chambers 154, 155, with a resultant hydraulic balance of the rotor so that substantially one hundred per cent of the radial load thereon is eliminated. Thus, there is no need for heavy bearings and casings to mount the rotor shaft 15 and the efficiency of the unit is greatly enhanced, as the drive motor overcomes but a minimum of friction rather than the friction afforded by the heavy bearing structure which otherwise need be provided. The elimination of heavy bearings for the shaft 15 also eliminates the likelihood of breakdown necessarily inherent when bearings are used which are under great stress and hence there will be no need for frequent stoppages of the pump for servicing and repair.

Inasmuch as the volume of the oil chamber 51 is relatively great, and the oil sucked thereinto through oil inlet port 12 is relatively cold, the rotor 14 and balancing ring 151, which is substantially completely encompassed by a relatively thick layer of such cool oil, will consequently be cooled so that overheating of the pump will be prevented. This cooling effect is enhanced by the fact that as the rotor is turned, the area thereof exposed between the spaced arcuate members 152, 153 will act as an impeller to circulate the oil in the same direction that the rotor is turning, and complete circulation of the oil is afforded by reason of the fact that the balancing ring only occupies a portion of the volume of the oil chamber as shown in Fig. 1.

If not for such cooling of the rotor and the balancing ring, the heat evolved by the pressure on the oil as well as the reciprocating movement of the plungers 21, 22 would cause the rotor to get extremely hot and the latter might expand at a different rate than that of the encompassing balancing ring with resultant "freezing" of such rotor due to the minute spacing between the rotor and the balancing ring. Such difficulties are avoided by the circulatory cooling action which prevents increase in the temperature of the oil to a point sufficient to effect such expansion of the rotor and balancing ring.

As substantially the entire pressure in the pump is confined in the discharge chamber 157 in the balancing ring 151, only such balancing ring 151 need be of heavy material such as steel, capable of withstanding such great pressures. Consequently, the casing 11 of the pump which defines the oil chamber 51 need only be of relatively thin wall, light weight material such as aluminum. In addition, such casing could be of inexpensive cast iron which could not be used if the casing had to withstand extremely high pressures, as the porosity of such casing would permit oozing of the oil through the wall thereof with resultant loss of such oil and inefficiency of the device.

As the balancing ring utilized in the equipment is relatively small in size, it may readily be handled during the fabrication of the pump. Thus, in order to secure the extremely close tolerances between the balancing ring and the rotor encompassed thereby, it is a relatively simple matter after the rotor is fabricated, to mount the relatively light weight balancing ring in a suitable jig and grind away the inner surface thereof so that the rotor fits therein with extremely close tolerances. As a result, high pressure may be developed in the discharge chamber without likelihood of the oil under pressure being forced past the lateral edges 164 of the discharge chamber 157 into the oil chamber 51. Such leakage of oil would result in reduction of the output of oil from the pump as well as a reduction of the pressure therein and added power would be required to raise the output and pressure to the desired amount.

If not for the balancing ring herein provided and if the casing itself encompassed the rotor, it would be extremely difficult to provide close tolerances between the rotor and the casing. For if such casing was mounted on a jig for machining so that the rotor would fit accurately therein, the heavy weight of the casing would prevent great accuracy, as even with a heavy jig to carry the same there would be a slight displacement of the casing as the mechanic worked thereon, which displacement might be greater than the desired tolerances required for a high pressure device.

With the construction above described, in addition to the advantages above pointed out, almost perfect suction will be achieved as the plungers 21, 22 are substantially positively connected to the inclined members 53, 54 without the use of springs of any sort. As a result, during the cycle of rotation of the rotor, the plungers will substantially positively be reciprocated, the slight play of the slide member between the locking ring 76 and the floor 66 being substantially negligible and only reducing the efficiency of the suction action by a negligible amount.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pump comprising a casing having a bore defining a supply chamber, said casing having an inlet port in communication with said supply chamber and an outlet port, a rotor rotatably mounted within the bore and having a plurality of circumferentially spaced passageways extending radially thereinto, a balancing ring in said supply chamber having a bore through which said rotor extends and having the major portion of its outer surface spaced from the wall of said supply chamber, the surface of said bore and the periphery of the rotor therein being conformed for precision fit therebetween to effect a liquid tight seal, said bore being the only portion of said ring requiring precision machining, means connecting said ring to said casing to restrain rotation of said ring, said ring having a discharge chamber therein in communication with said outlet port, said discharge chamber being in communication with said line of circumferentially spaced passageways and lying thereover, a pair of spaced balancing chambers in said ring in communication with said discharge chamber and substantially diametrically opposed thereto, said balancing chambers being in communication with the surface of said rotor and located on opposite sides of said line of circumferentially spaced passageways, said ring having an inlet providing communication from said supply chamber to said line of circumferentially spaced passageways between said balancing chambers, the area of the rotor exposed in said discharge chamber being substantially equal to the combined areas of the rotor exposed in said balancing chamber, and means in said rotor associated with said radial passageways to effect suction action thereinto from said supply chamber during one portion of the cycle of rotation of said rotor and to effect discharge action therefrom into said discharge chamber during another portion of the cycle of rotation of said rotor.

2. A pump comprising a casing having a bore defining a supply chamber, said casing having an inlet port in communication with said supply chamber and an outlet port, a rotor rotatably mounted within the bore and having a plurality of circumferentially spaced passageways extending radially thereinto, a balancing ring in said supply chamber having a bore through which said rotor extends and having the major portion of its outer surface spaced from the wall of said supply chamber, the surface of said bore and the periphery of the rotor therein being conformed for precision fit therebetween to effect a liquid-tight seal, said bore being the only portion of said ring requiring precision machining, means connecting said ring to said casing to restrain rotation of said ring, said ring comprising a pair of spaced arcuate members positioned on opposite sides of said line of radial passageways for substantially one half the circumference of said rotor defining an inlet therebetween from said supply chamber to said passageways, and a substantially arcuate projection substantially diametrically opposed to said arcuate members, lying over said line of said circumferentially spaced passageways for substantially the other half of the circumference of said rotor, said arcuate members and said arcuate projection each having an arcuate groove in the undersurface thereof in communication with each other and with the surface of said rotor, the combined areas of said rotor exposed in the arcuate grooves in said arcuate members being substantially equal to the area of said rotor exposed in the arcuate groove in said arcuate projection, and means in said rotor associated with said radial passageways to effect suction action thereinto through the inlet formed between the pair of spaced arcuate members from said supply chamber during one portion of the cycle of rotation of said rotor and to effect discharge action therefrom through said outlet port during another portion of the cycle of rotation of said rotor.

3. The combination set forth in claim 2 in which said rotor has a plurality of longitudinal bores therethrough equidistantly spaced around the axis of said rotor and said plurality of said circumferentially spaced passageways extend radially into said plurality of longitudinal bores respectively, a plunger slidably mounted in each of said longitudinal bores, and means provided to reciprocate said plungers to effect the suction and discharge action.

References Cited in the file of this patent

UNITED STATES PATENTS

| Number | Name | Date |
|---|---|---|
| 1,189,319 | Walker | July 4, 1916 |
| 2,079,119 | Hillis | May 4, 1937 |
| 2,430,753 | Ziska | Nov. 11, 1947 |

FOREIGN PATENTS

| Number | Country | Date |
|---|---|---|
| 851,663 | France | 1939 |